United States Patent
Rivera et al.

(10) Patent No.: US 10,339,730 B2
(45) Date of Patent: Jul. 2, 2019

(54) FAULT DETECTION USING HIGH RESOLUTION REALMS

(71) Applicant: UNITED TECHNOLOGIES CORPORATION, Farmington, CT (US)

(72) Inventors: Linda I. Rivera, Norwalk, CT (US); Gregory S. Hagen, Glastonbury, CT (US); Alexander I. Khibnik, Melrose, MA (US)

(73) Assignee: UNITED TECHNOLOGY CORPORATION, Farmington, CT (US)

( * ) Notice: Subject to any disclaimer, the term of this patent is extended or adjusted under 35 U.S.C. 154(b) by 93 days.

(21) Appl. No.: 15/590,565

(22) Filed: May 9, 2017

(65) Prior Publication Data

US 2018/0330557 A1    Nov. 15, 2018

(51) Int. Cl.
*B64F 5/60* (2017.01)
*G07C 5/08* (2006.01)
*G05B 23/02* (2006.01)
*B64D 45/00* (2006.01)
*G08B 21/18* (2006.01)

(52) U.S. Cl.
CPC .......... *G07C 5/0816* (2013.01); *B64D 45/00* (2013.01); *B64F 5/60* (2017.01); *G05B 23/0235* (2013.01); *G05B 23/0245* (2013.01); *G08B 21/187* (2013.01)

(58) Field of Classification Search
CPC ....... B64D 45/00; B64F 5/60; G05B 23/0235; G05B 23/0245; G05B 23/024; G07C 5/0816; G08B 21/187; F05D 2220/323; B60K 15/077

See application file for complete search history.

(56) References Cited

U.S. PATENT DOCUMENTS

| 7,027,953 B2 | 4/2006 | Klein |
| 7,725,293 B2 | 5/2010 | Bonissone et al. |
| 8,417,410 B2 | 4/2013 | Moeckly et al. |
| 8,744,813 B2 | 6/2014 | Lacaille et al. |

(Continued)

FOREIGN PATENT DOCUMENTS

EP    3258070    12/2017

OTHER PUBLICATIONS

Europeant Patent Office, European Search Report dated Sep. 12, 2018 in Application No. 18160262.4-1204.

*Primary Examiner* — Mirza F Alam
(74) *Attorney, Agent, or Firm* — Snell & Wilmer, L.L.P.

(57) ABSTRACT

An article of manufacture including a tangible, non-transitory computer-readable storage medium having instructions stored thereon for detecting a fault in a gas turbine engine that, in response to execution by a controller, cause the controller to perform operations comprising receiving, by the controller, a first data output from a first flight data source; receiving, by the controller, a second data output from a second flight data source; determining, by the controller, a first flight realm of the first data output based on the second data output; identifying, by the controller, a fault threshold using a first parameter of the first flight realm; and comparing, by the controller, the first data output to the fault threshold.

19 Claims, 8 Drawing Sheets

(56) References Cited

U.S. PATENT DOCUMENTS

| | | | |
|---|---|---|---|
| 2004/0030417 A1* | 2/2004 | Gribble | G05B 9/02 |
| | | | 700/29 |
| 2007/0067678 A1* | 3/2007 | Hosek | G05B 23/0235 |
| | | | 714/25 |
| 2009/0055145 A1 | 2/2009 | Volponi et al. | |
| 2010/0023307 A1* | 1/2010 | Lee | G05B 23/0254 |
| | | | 703/7 |
| 2010/0253512 A1* | 10/2010 | Wagner | G05B 23/0229 |
| | | | 340/540 |
| 2011/0288836 A1* | 11/2011 | Lacaille | G05B 23/0254 |
| | | | 703/2 |
| 2014/0201571 A1* | 7/2014 | Hosek | G06F 11/2257 |
| | | | 714/26 |

* cited by examiner

FAULT DETECTION USING HIGH RESOLUTION REALMS

STATEMENT OF GOVERNMENT INTEREST

This disclosure was made with government support under contract No. N00019-14-C-0026 awarded by the United States Navy. The government has certain rights in the disclosure.

FIELD

The present disclosure relates generally to gas turbine engines, and more specifically, to systems and methods for monitoring the health of gas turbine engines.

BACKGROUND

Gas turbine engines typically comprise a compressor module, a combustor module, and a turbine module, along with subsystems and accessories to control cooling, air bleed, variable geometry, etc. All these components of the gas turbine engine, along with their attendant sensors, wear over time and may be prone to fault or failure. In order to mitigate the risk of fault events, gas turbine engines undergo complex and time consuming periodic inspections. While fault detection systems and sensors may reduce the frequency of inspections, they tend to generate an unacceptable level of false alarms.

SUMMARY

Systems and methods for detecting fault conditions in a gas turbine engine are disclosed. An article of manufacture may include a tangible, non-transitory computer-readable storage medium having instructions stored thereon for detecting a fault in a gas turbine engine that, in response to execution by a controller, cause the controller to perform operations, which may comprise: receiving, by a controller, a first data output from a first flight data source, receiving, by the controller, a second data output from a second flight data source, determining, by the controller, a first flight realm of the first data output based on the second data output, identifying, by the controller, a fault threshold using a first parameter of the first flight realm, and comparing, by the controller, the first data output to the fault threshold.

In various embodiments, the identifying, by the controller, the fault threshold of the first data output may further comprise receiving, by the controller, a third data output from a third flight data source, determining, by the controller, a second flight realm of the first data output based on the third data output, and identifying, by the controller, the fault threshold using the first parameter of the first flight realm and a second parameter of the second flight realm.

In various embodiments, the first flight realm may define at least one of an engine steady state or an engine transient state. The fault threshold may comprise a first value in the engine steady state and a second value in the engine transient state. In various embodiments, the controller may display an alert on a display device if the first data output exceeds the fault threshold.

In various embodiments, the controller may perform a realm tuning operation. The realm tuning operation may comprise verifying an accuracy of the alert and updating a fault detection parameter. Updating the fault detection parameter may comprise at least one of modifying, by the controller, a fault detection algorithm changing, by the controller, the first parameter of the first flight realm, or changing, by the controller, the fault threshold. In various embodiments, the accuracy of the alert is verified during a post-flight inspection.

A method for fault detection in a gas turbine engine may comprise receiving, by a controller, a first data output, receiving, by the controller, a second data output; determining, by the controller, a first flight realm of the first data output based on the second data output, identifying, by the controller, a fault threshold using a first parameter of the first flight realm, comparing, by the controller, the first data output to the fault threshold; and displaying, by the controller, an alert if the first data output exceeds the fault threshold.

In various embodiment, the identifying, by the controller, the fault threshold may further comprise receiving, by the controller, a third data output, determining, by the controller, a second flight realm of the first data output based on the third data output, and identifying, by the controller, the fault threshold using the first parameter of the first flight realm and a second parameter of the second flight realm.

In various embodiments, the method may further comprise accessing, by the controller, a realm parameter database. The realm parameter database may comprise a realm lookup table. The method may further comprise performing a realm tuning operation. In various embodiments, the performing the realm tuning operation comprises verifying an accuracy of the alert, and updating a fault detection parameter. Updating the fault detection parameter may comprise at least one of modifying, by the controller, a fault detection algorithm, changing, by the controller, a parameter of the first flight realm or changing, by the controller, the fault threshold.

A system for fault detection in a gas turbine engine is disclosed, according to various embodiments. A system for fault detection in a gas turbine engine may comprise a controller; an engine flight data source in communication with the controller, and a tangible, non-transitory memory configured to communicate with the controller, the tangible, non-transitory memory having instructions stored thereon that, in response to execution by the controller, cause the controller to perform operations comprising: receiving, by a controller, a first data output, receiving, by the controller, a second data output, determining, by the controller, a first flight realm of the first data output based on the second data output, identifying, by the controller, a fault threshold using a first parameter of the first flight realm, and comparing, by the controller, the first data output to the fault threshold.

In various embodiments, the identifying, by the controller, the fault threshold may comprise receiving, by the controller, a third data output, determining, by the controller, a second flight realm of the first data output based on the third data output; and identifying, by the controller, the fault threshold using the first parameter of the first flight realm and a second parameter of the second flight realm. An alert may be in communication with controller. In various embodiments, upon detection of a false alert, a realm tuning operation may be performed. The realm tuning operation may comprise at least one of modifying, by the controller, a fault detection algorithm; changing, by the controller, a parameter of the first flight realm, or changing, by the controller, the fault threshold.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Figure 1:
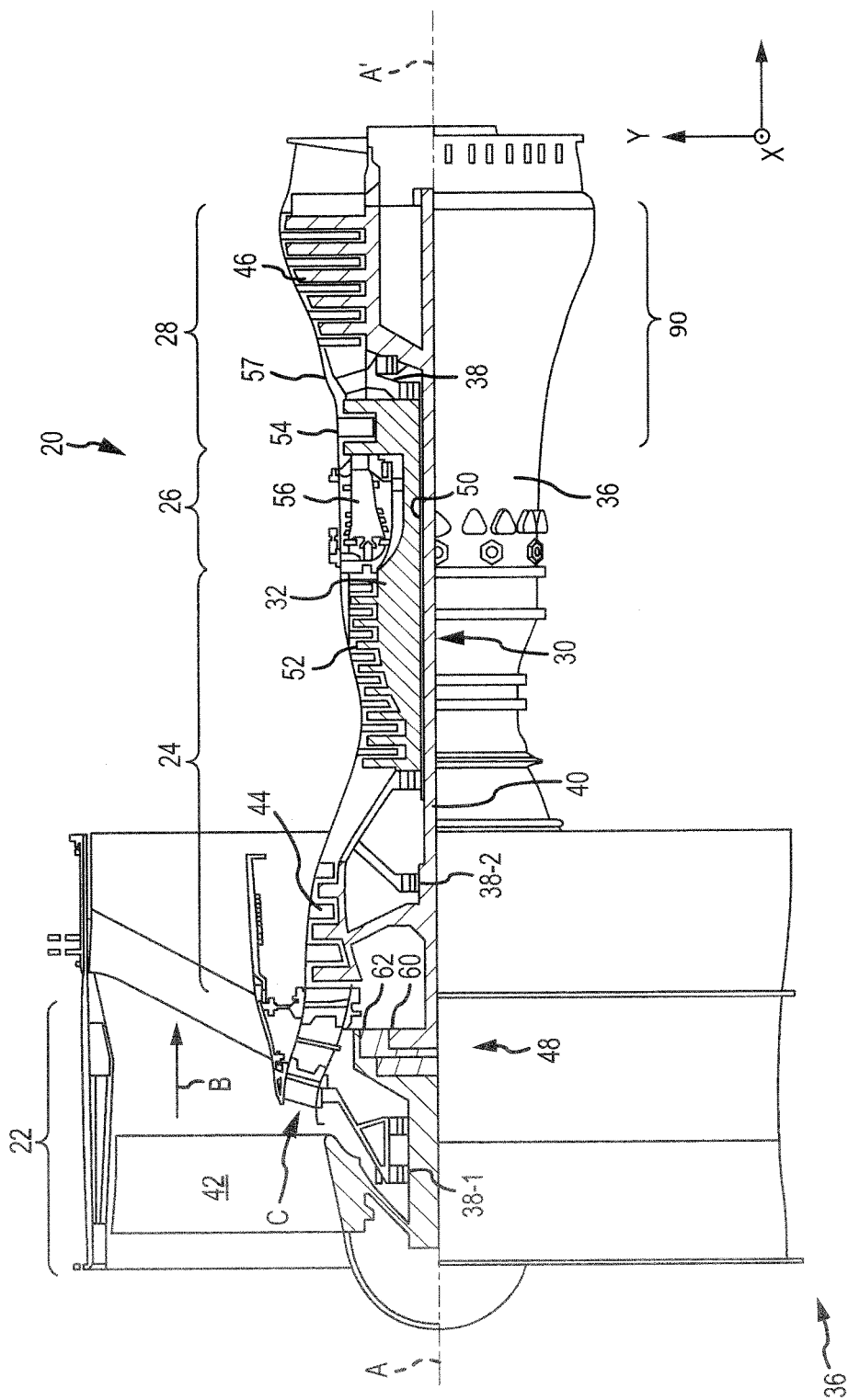
FIG. 1 illustrates a gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
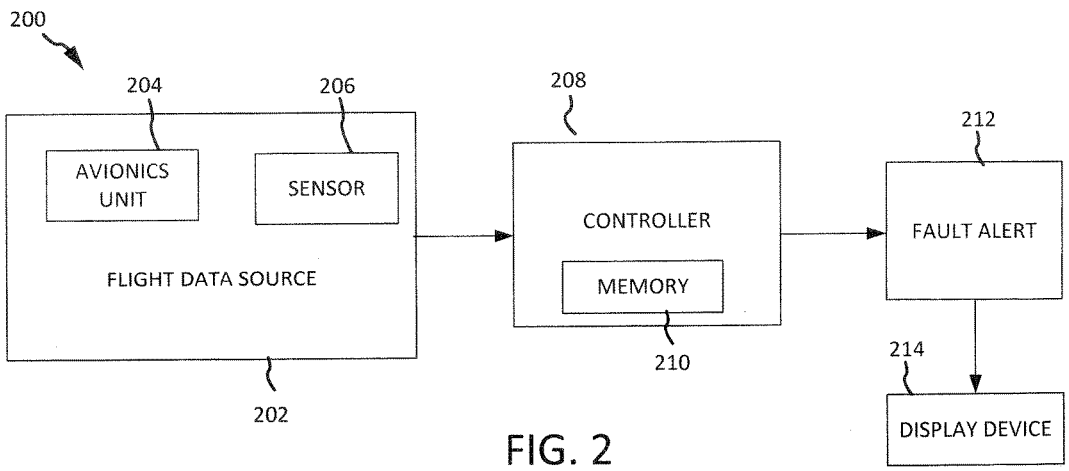
FIG. 2 illustrates a block diagram of a fault detection system for an aircraft, in accordance with various embodiments.

With reference to FIG. 2, a schematic diagram of a fault detection system 200 is illustrated, in accordance with various embodiments. Fault detection system 200 may comprise flight data source 202. Flight data source 202 may output data signals and/or information relating to engine and/or flight parameters from one or more avionics units 204 and/or sensors 206. Avionics units 204 and sensors 206 may detect operating conditions of gas turbine engine 20 (FIG. 1). Sensors 206 may comprise one or more frequency sensors, vibration sensors, magnetic sensors, pressure sensors, temperature sensors, fuel flow sensors, or any other sensor capable of measuring a state of an engine component or other flight parameter.

Flight data source 202 may be in communication with a controller 208. In various embodiments, controller 208 may comprise a full authority digital engine control (FADEC) system. In various embodiments, portions of a fault detection system 200 may be located off-board. In this regard, controller 208 may be located externally from an aircraft, in any suitable computer-based system. Controller 208 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

In various embodiments, controller 208 may receive flight data from flight data source 202. Controller 208 may receive data from one or more avionics units 204 and/or one or more sensors 206. Flight data source 202 may output fight data to controller 208 as a voltage signal, a current signal, a digital signal, or any other suitable signal, whether filtered, conditioned, or otherwise preprocessed. Controller 208 may include a memory 210. Memory 210 may store executable instructions and data to implement control logic of controller 208. Memory 210 may comprise a tangible, non-transitory storage medium and may store data used, for example, for trending and prognosis purposes.

Controller 208 may be in logical and/or electronic communication with flight data source 202. Controller 208 may receive data output from flight data source 202 correlating to various engine operating conditions, such as an altitude of the aircraft, an ambient temperature, a speed of the aircraft, Mach number, location information, a rotational speed of low speed spool 30, a rotational speed of high speed spool 21 (FIG. 1), a presence of foreign object debris, or any other operating information.

Controller 208 may interpret data received from flight data source 202 for fault detection. In various embodiments, controller 208 may receive and may use multiple data outputs from one or more sensors 206 and/or avionics units 204 to determine if a fault condition exists. Data received from flight data source 202 may allow controller 208 to detect the presence of a fault condition or other operating anomaly with increased accuracy. In various embodiments, upon recognition of a fault condition, controller 208 will order display of a fault alert 212 on a display device 214. Fault alert 212 may be displayed as a symptom code included in an engine health report, which may be reviewed during a post flight check and/or during a routine maintenance inspection. In various embodiments, fault alert 212 may be displayed on a display device 214 such as an indicator light or monitor in the cockpit of the aircraft. In various embodiments, fault alert 212 may be displayed on display device 214 to indicate immediate maintenance is needed.

Figure 3:
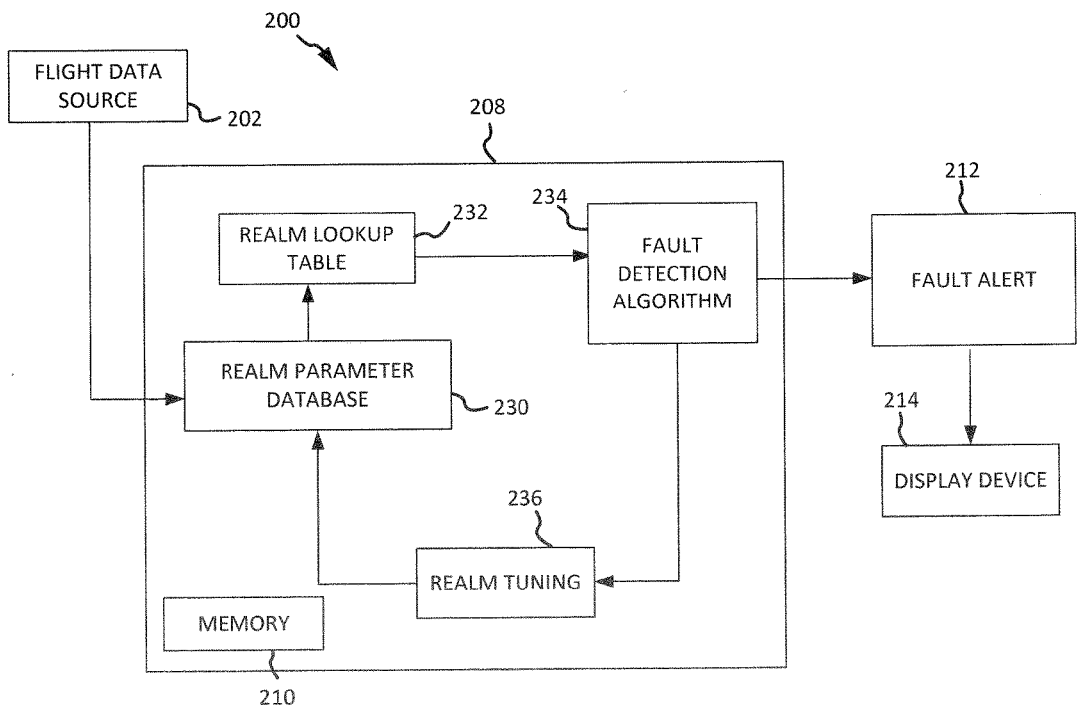
FIG. 3 illustrates a block diagram of a fault detection system, in accordance with various embodiments.

With reference to FIG. 3, controller 208 may determine fault events by dividing flight data from flight data source 202 into one or more flight realms. Controller may use a realm parameter database 230 to determine within which flight realm a particular data output received from flight data source 202 belongs. Realm parameter database 230 may comprise instructions stored in memory 210, which cause controller 208 to perform various operations, including flight realm determination. Controller 208 may determine whether a fault condition exists, after determining in which flight realm a particular piece of data belongs. Realm parameter database 230 may be in logical and/or electrical communication with a realm lookup table 232. Realm lookup table 232 may define one or more parameters of a plurality of flight realms and/or flight realm dimensions. Controller 208 may identify a flight realm for use in fault detection using any available flight and/or engine parameters (i.e., using any data output from flight data source 202). The parameters defining the flight realms and the fault threshold associated with various fault conditions may be stored in realm lookup table 232.

Controller 208 may include a fault detection algorithm 234. Fault detection algorithm 234 may comprise instructions stored in memory 210 which cause the controller 208 to perform various operations including comparing flight data received from flight data source 202 with flight realm parameters and fault thresholds stored in realm lookup table 232. Fault detection algorithm 234 may be a component of controller 208 or may be implemented outside of controller 208 and may operate in concert with controller 208. Controller 208 may input fault threshold information and/or other flight realm parameter from realm parameter database 230 and/or realm lookup table 232 into fault detection algorithm 234. Controller 208 may compare, interpret, and/or analyze data output received from flight data source 202 using fault detection algorithm 234. Fault detection algorithm may cause controller 208 to compare data received from flight data source 202 to a fault threshold identified using realm lookup table 232. Fault detection algorithm 234 may cause controller 208 to display an alert if the data output received from flight data source 202 exceeds the fault threshold.

Sorting flight data output into various flight realms for fault detection, may allow controller 208 to employ finely tuned fault threshold values, as discussed in further detail below. The finely tuned fault threshold values may increase a fault detection accuracy of fault detection system 200. Stated another way, by using flight realms, fault threshold values may be adjusted to suit the flight realm. In this manner, a fault threshold may be closely tailored to the flight realm.

For example, with combined reference to FIG. 2 and FIG. 3, controller 208 may receive a first data output from a first flight data source 202 (e.g., a sensor 206). Controller 208 may use a second data output received from a second flight data source 202 (e.g., an avionics unit 204) to determine a flight realm of the first data output.

In various embodiments, the first data source and the second data source may be the same. For example, the flight realm of the first data output may be determined by averaging and/or aggregating data output from the first flight data source in a trailing time-window. Stated another way, the parameters of the flight realm may be defined by an average or aggregate of data output received from the first flight data source earlier in time. For example, controller 208 may calculate an average value of the earlier data output from a first flight data source, and the average value may be used to define the parameters of the flight realm, which will be used to determine a fault threshold of the new (or real-time) first data output.

In various embodiments, a flight realm may define an engine steady state or an engine transient state, and the parameters of the flight realm may be defined by a variance in the first data output. Stated another way, controller 208 may receive a first data output. Controller 208 may then determine a flight realm, for fault condition determination, based on whether a variance of the first data output is above or below a predetermined variance threshold. For example, controller 208 receives altitude data (i.e., the first data output). Controller 208 determines a variance in the altitude data, and compares the variance in the altitude data to a predetermined variance threshold. If controller 208 determines the altitude data is over the predetermined variance threshold (e.g., if the altitude is increasing or decreasing at a rate greater than, for example, 900 meters per minute), then controller 208 determines the flight realm is an engine transient state. In various embodiments, the engine transient state may correlate to an engine take-off state or an engine landing state. If controller 208 determines the variance in altitude data is less than the predetermined threshold (e.g., if the altitude is increasing or decreasing at a rate of less than, for example, 900 meters per minute), then controller 208 determines the flight realm is an engine steady state. In various embodiments, the engine steady state may correlate to an engine cruising state. As discussed below, controller 208 may identify a fault threshold based on the flight realm determination (i.e., based on whether the engine is in a steady state or a transient state).

Controller 208 may identify a fault threshold, indicative of a fault condition, of the first data output based on the flight realm determination. For example, controller 208 may identify a fault threshold associated with a first data output (e.g., a vibration sensor signal) received by controller 208, based on a second data output (e.g., an altitude measurement) generated at the same time as the first data output.

FIGS. 5A, 5B, 5C, and 5D, illustrate an ability of fault detection system 200, with momentary reference to FIG. 3, to employ finely tuned fault thresholds for increased fault detection accuracy, in accordance with various embodiments. While FIGS. 5A, 5B, 5C, and 5D illustrate finely tuned fault thresholds using vibration sensor data as the first data output and altitude data as the second data output, it should be understood that the first data output and the second data output may be data output received from any flight data source 202, with momentary reference to FIG. 3.

Figure 5A:
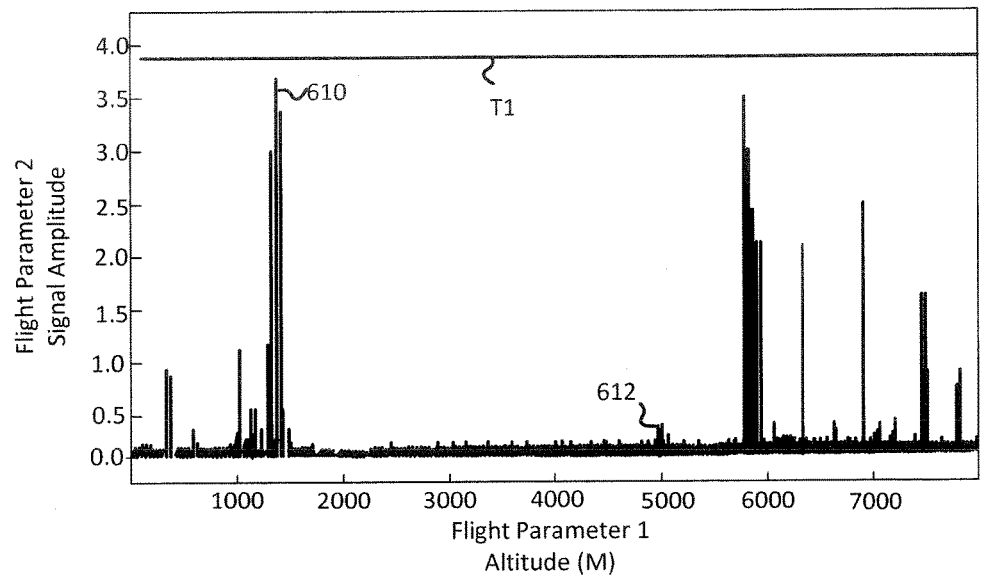
FIGS. 5A, 5B, 5C, and 5D illustrate graphical representations of finely tuned fault thresholds based on flight realm determination, in accordance with various embodiments.

FIG. 5A graphs an amplitude of a vibration sensor signal, received by controller 208 (FIG. 2), against the altitude of the flight at the time of the vibration sensor signal, over an entire flight. For example, at a first point in time 610, the amplitude of the vibration sensor signal was 3.7 and the altitude was 1500 meters (M). At a second point in time 612, the amplitude of the vibration signal was 0.5 and the altitude was 5000 M. Due to the variation in the amplitude of the vibration signal over the course of an entire flight, a fault threshold T1, indicative of a fault condition, may tend to be set either too high, which can lead to false negatives (i.e., missed fault conditions), or too low, which can lead to false positives (i.e., alerts when no fault condition exists).

Figure 5B:
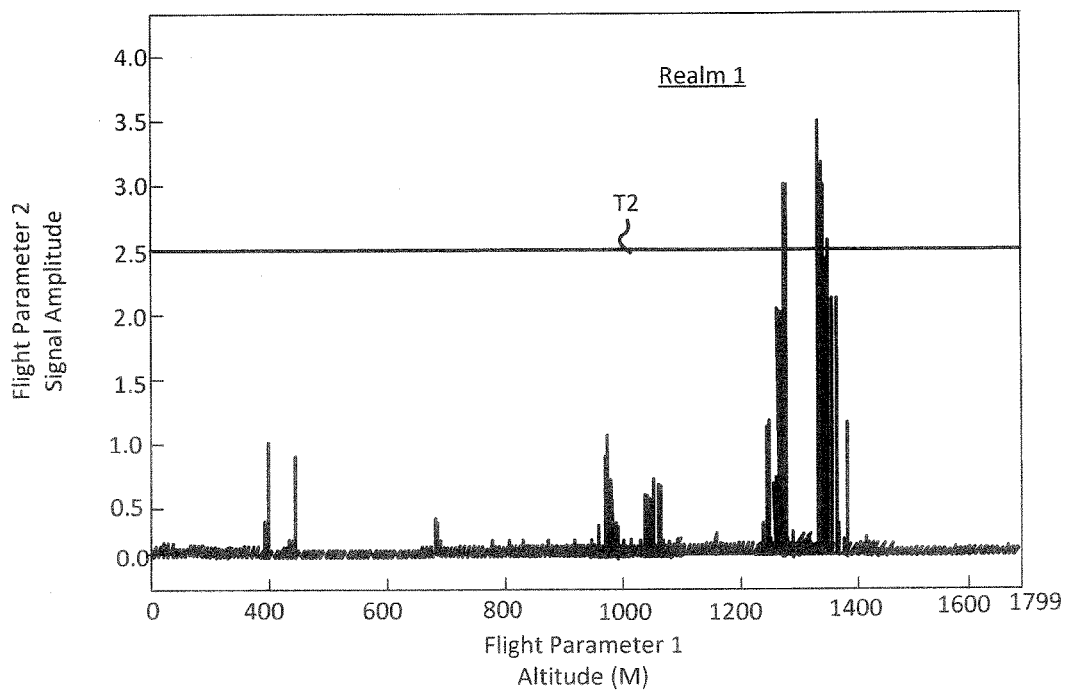

FIG. 5B graphs an amplitude of a vibration sensor signal, received by controller 208 (FIG. 2), against the altitude of the flight at the time of the vibration sensor signal, during a first flight realm (i.e., Realm 1), where the first flight realm is defined by the altitude being between 0 M and 1799 M. Stated another way, a parameter of the first flight realm is a flight altitude of less than 1800 M.

Figure 5C:
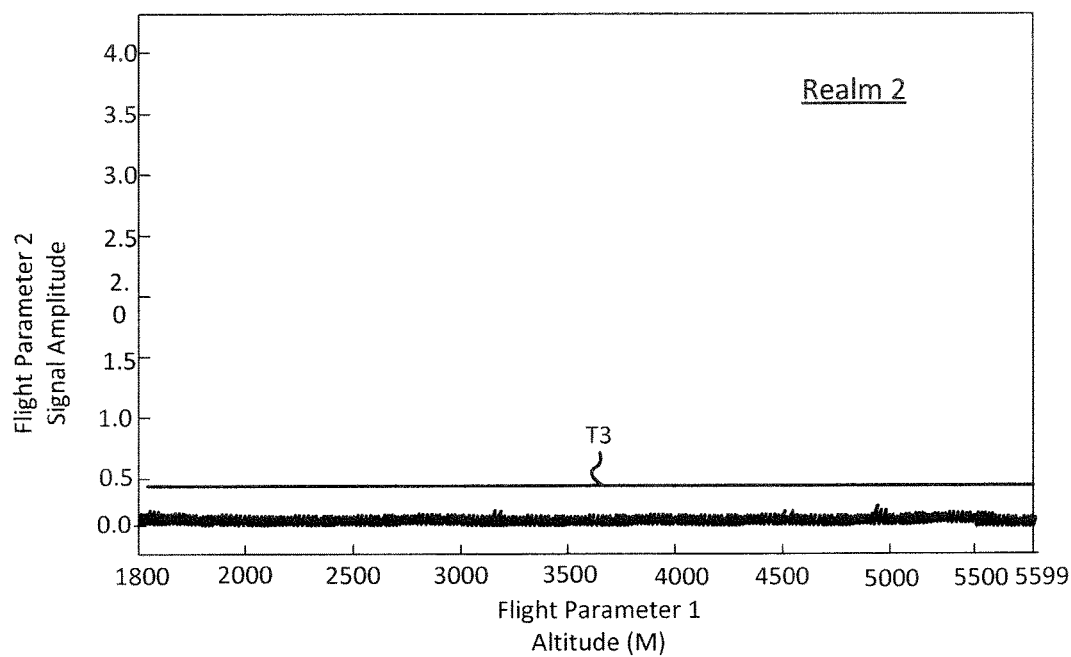

FIG. 5C graphs an amplitude of a vibration sensor signal, received by controller 208 (FIG. 2), against the altitude of the flight at the time of the vibration sensor signal, during a second flight realm (i.e., Realm 2), where the second flight realm is defined by the altitude being between 1800 M and 5599 M. Stated another way, a parameter of the second flight realm is a flight altitude between 1800 M and 5599 M.

Figure 5D:
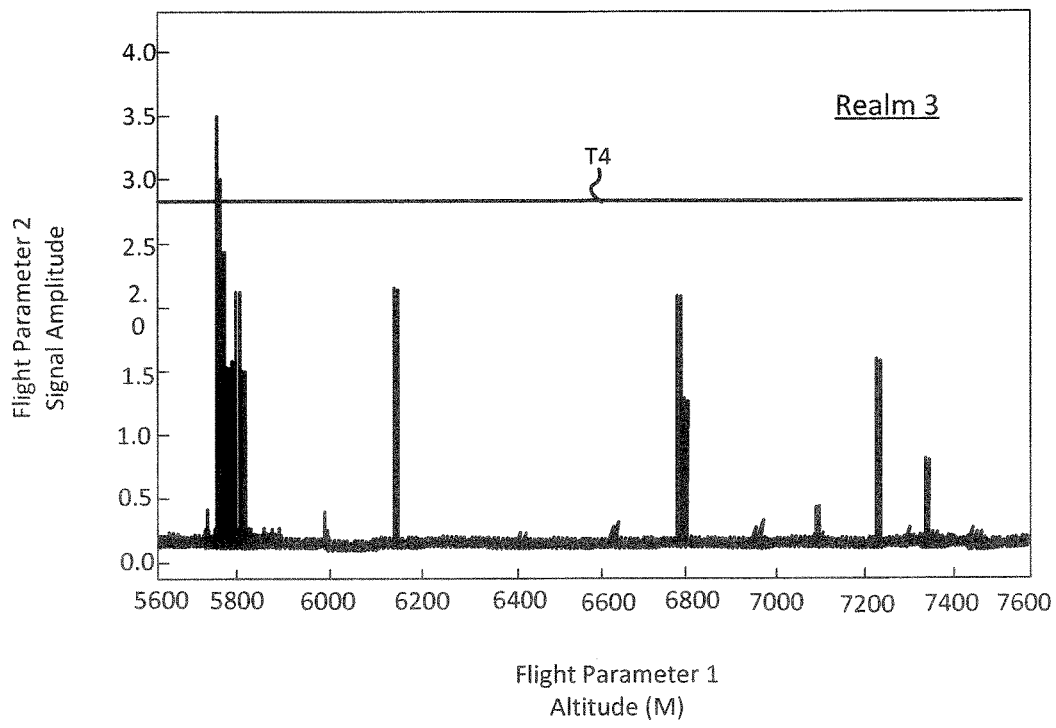

FIG. 5D illustrates an amplitude of a vibration sensor signal, received by controller 208 (FIG. 2), against the altitude of the flight at the time of the vibration sensor signal, during a third flight realm (i.e., Realm 3), where the third flight realm is defined by the altitude being between 5600 M and 7600 M. Stated another way, a parameter of the third flight realm is a flight altitude of greater than 5599 M.

Each of flight realms may have a specific fault threshold associated therewith. Stated differently, an amplitude value of a fault threshold T2 in the first flight realm (FIG. 5B) is different from an amplitude value of a fault threshold T3 in the second flight realm (FIG. 5C), and an amplitude value of a fault threshold T4 in the third flight realm (FIG. 5D) is different from the amplitude value of fault threshold T3 and fault threshold T2. In this manner, the fault thresholds may be finely tuned within each flight realm. For example, if controller 208 determines a vibration signal was generated when the altitude was between 1800 M and 5599 M, controller 208 can identify that the vibration signal should not be above 2.7 (i.e., above fault threshold T4). Stated another way, if the vibration signal is greater than 2.7, controller 208 can determine a fault condition exists.

By holding the realm constant and adjusting the fault threshold, the false negatives and/or false positives, which may result from setting a single fault threshold for an entire flight may be avoided. For example, at certain flight operating conditions/times, a vibration signal amplitude of 0.5 may be indicative of a fault condition. While at other times during the flight, signal amplitudes of 2.7 or greater may be indicative of a fault condition (i.e., signal amplitudes between 0.5 and 2.6 would not be indicative fault). Thus, if a fault threshold of 0.5 (e.g., fault threshold T3 in FIG. 5C) was used for determining a fault condition throughout an entire flight, multiple false alerts (i.e., false positives) may be generated, as an signal amplitude of 1.0 would result in an alert, but may not be indicative of a fault condition due to signal amplitudes of 1.0 being produced in normal/non-fault operating conditions at flight altitude of less than 1800 M or greater than 5600 M (i.e., in Realm 1 and Realm 2, respectively). If a fault threshold of 2.7 (e.g., fault threshold T4 in FIG. 5D) was used for determining a fault condition throughout the entire flight, fault conditions may be missed (i.e., false negative produced) as a signal amplitude of 1.0 would not produce a fault alert, but may be indicative of a fault condition, particularly at altitudes between 1800 M and 5599 M (i.e., in Realm 2). Thus, separating flight data output into various flight realms for fault detection may allow for more finely tuned fault thresholds, which may increase fault detection accuracy.

Figure 6:
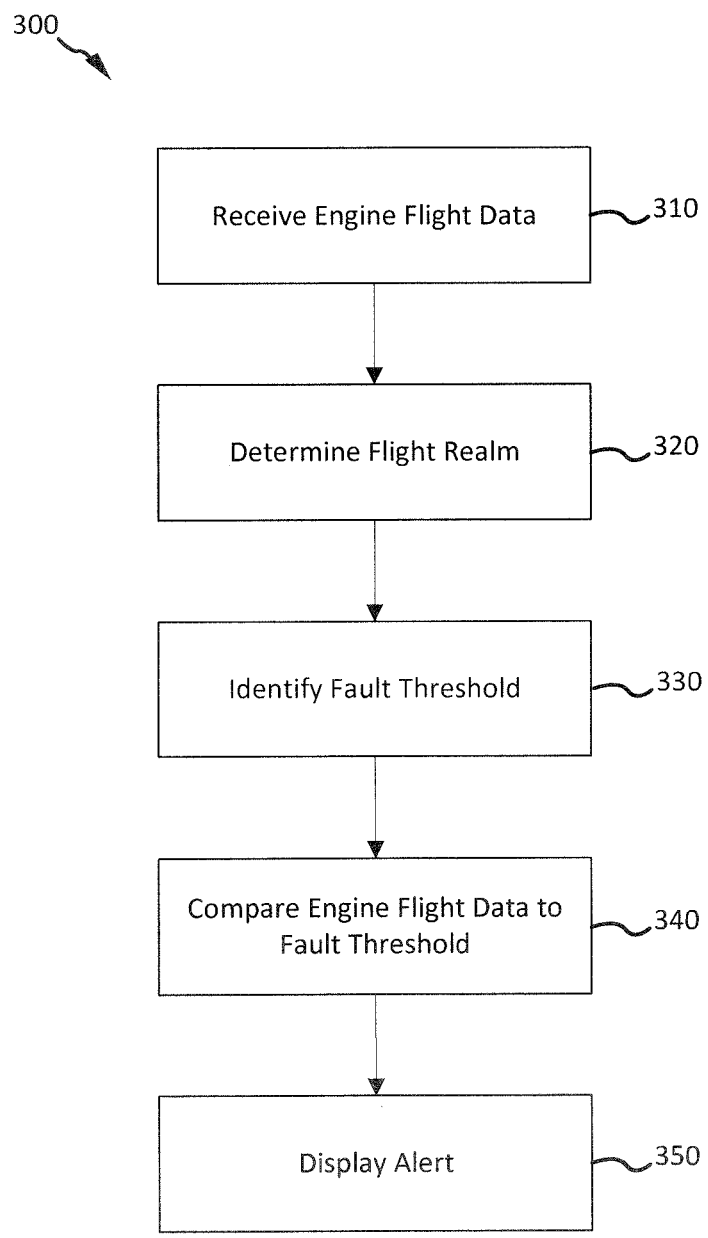
FIG. 6 illustrates a flow chart of a method for detecting a fault condition, in accordance with various embodiments.

With reference to FIG. 6, a method 300 of detecting a fault condition in a gas turbine engine is provided, in accordance with various embodiments. Method 300 may comprise receiving engine flight data (step 310), determining a flight realm of the engine flight data (step 320), identifying a fault threshold (step 330), comparing a fault threshold to the engine flight data (step 340), and displaying an alert (step 350).

In various embodiments, with combined reference to FIG. 6 and FIG. 2, step 310 may comprise receiving, by controller 208 engine flight data from flight data source 202. Step 320 may comprise determining, by controller, 208, a flight realm of the engine flight data received from flight data source. Step 330 may comprise identifying, by controller 208, a fault threshold. Step 340 may comprise comparing, by controller 208, the fault threshold to the engine flight data received from flight data source 202. Step 350 may comprise displaying, by controller 208, a fault alter 212. Controller may display the fault alter if the flight data received from flight data source 202 is above the fault threshold.

Figure 7:
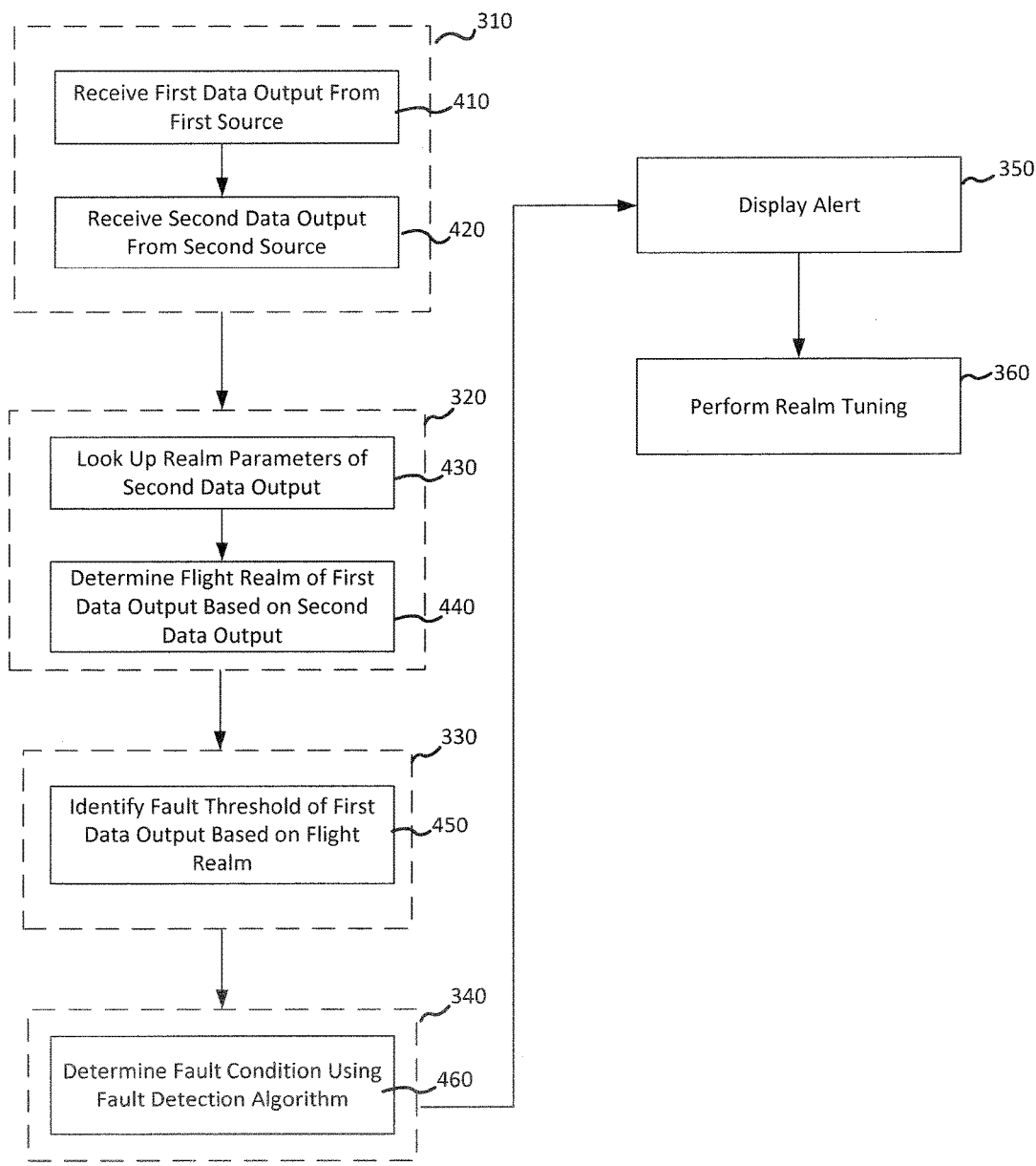
FIG. 7 illustrates a flow chart of a method for detecting a fault condition, in accordance with various embodiments.

With reference to FIG. 7, in various embodiments, step 310 of method 300 may comprise receiving a first data output from a first flight data source (step 410), and receiving a second data output form a second flight data source. Step 320 of method 300 may comprise looking up flight realm parameters of the second data output (step 430), and determining a flight realm of the first data output using a parameter of the second data output. Step 330 of method 300 may comprise identifying the fault threshold of first data output using a parameter of the flight realm (step 450). Step 340 of method 300 may comprise determining if a fault condition exists using a fault detection algorithm (step 460).

With combined reference to FIG. 2, FIG. 3 and FIG. 7, in various embodiments, step 410 may comprise receiving, by controller 208, a first data output from a first flight data source, for example, from sensor 206. Step 420 may comprise receiving, by controller 208, a second data output from a second flight data source, for example, from avionics unit 204. In various embodiments, the first flight data source and the second flight data source may both comprise sensors 206. In various embodiments, the first flight data source and the second flight data source may both comprise avionics units 204. In various embodiments, the first flight data source may comprise an avionics unit 204 and the second flight data source may comprise a sensor 206.

In various embodiments, step 430 may comprise looking up, by controller 208, flight realm parameters associated with the second data output in realm lookup table 232. Step 440 may comprise determining, by controller 208, a flight realm of the first data output based on the flight realm parameters of the second data output. In various embodiments, the parameters of second data output are configured such that a flight realms coincide with an engine take-off state, an engine cruising state, and/or an engine landing state. Step 450 may comprise identifying, by controller 208, a predetermined fault threshold of first data output based upon the flight realm determination. In various embodiments, the value of the fault threshold may be different in different flight realms. For example, if the first data output leads to a determination by controller 208 that the second data output was produced during a first flight realm (e.g., a takeoff state), then the fault thresholder will have a first value. If the first data output leads to a determination by controller 208 that the second data output was produced during a second flight realm (e.g., a cruising state), then the fault threshold will have a second value. If the first data output leads to a determination by controller 208 that the second data output was produced during a third flight realm (e.g., a landing state), then the fault threshold will have a third value. Step 460 may comprise determining, by controller 208, that a fault condition exists using fault detection algorithm 234.

Figure 8:
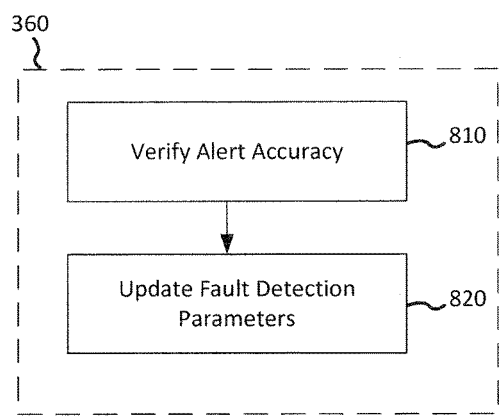
FIG. 8 illustrates a flow chart of a realm tuning operation for detecting a fault condition, in accordance with various embodiments.

With reference to FIG. 7 and FIG. 8, in various embodiments, method 300 may optionally include performing a realm tuning (step 360). Performing the realm tuning may include verifying an accuracy of the alert (step 810), and updating fault detection parameters. In various embodiments, the fault detection parameters may be updated in response to a determination that alert was a false alert. In various embodiments, the fault detection parameters may be updated in response to a determination that a fault condition did not produce an alert. The verification of the alert accuracy may be performed during a post-flight evaluation, a routine or previously scheduled maintenance check of the engine, or in response to an alert displayed by the controller indicating a need for an immediate and/or unscheduled maintenance due to a fault condition.

Figure 9:
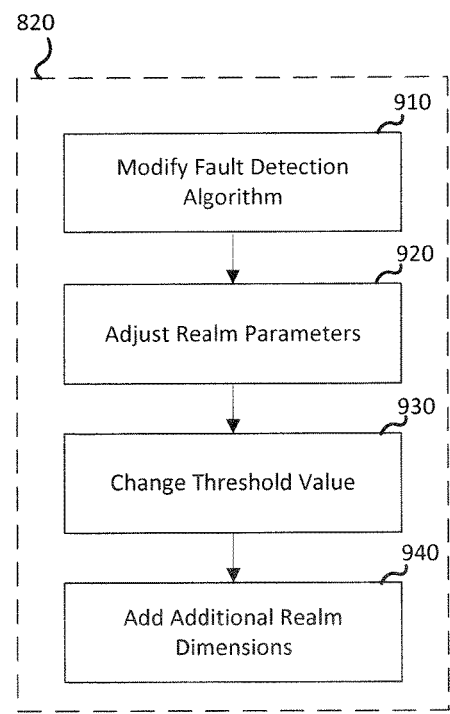
FIG. 9 illustrates a flow chart of a realm tuning operation for detecting a fault condition, in accordance with various embodiments.

With reference to FIG. 9, in various embodiments, updating the fault detection parameters may include modifying the fault detection algorithm (step 910). In various embodiments, updating the fault detection parameters may include adjusting flight realm parameters (step 920). Updating the fault detection parameters may include changing a fault threshold (step 930). Updating the fault detection parameters may also include adding additional flight realm dimensions to the threshold determination (step 940).

Figure 4:
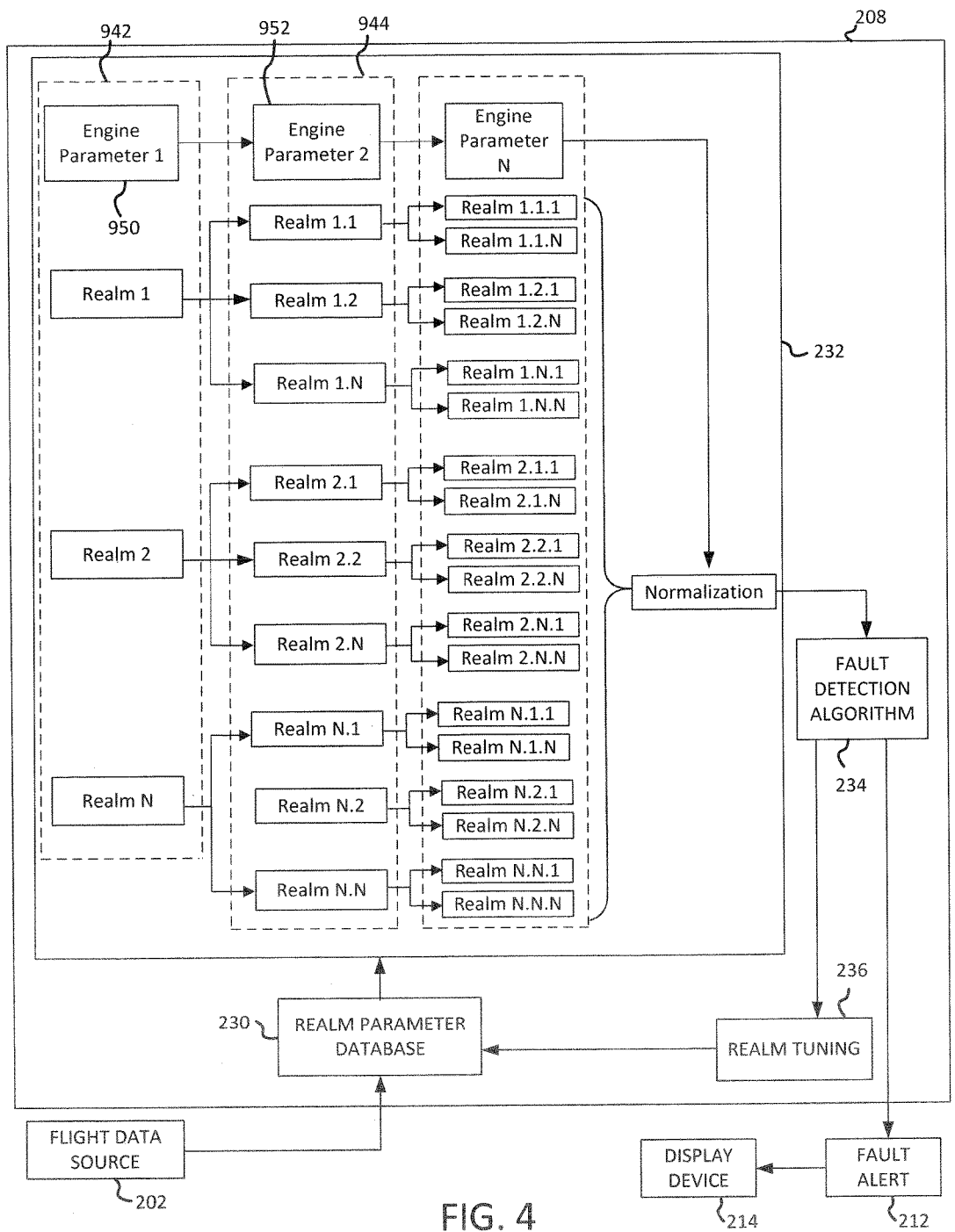
FIG. 4 illustrates a block diagram of a fault detection system, in accordance with various embodiments.

In various embodiments, with combined reference to FIG. 4 and FIG. 9, step 910 may comprise modifying, by controller 208, fault detection algorithm 234. Step 920 may comprise adjusting, by controller 208, the parameters of one or more flight realms in realm parameter database 230 and/or realm lookup table 232. For example, in response to one or more false alerts and/or missed fault events, the parameters defining the flight realms may be adjusted. Adjusting the flight realm parameters may create a new flight realm within a particular flight realm dimension. For example, if flight speed is used as a flight realm determinative parameter and defines three separated flight realms (e.g., speeds of 0 miles per hour (mph) to 20 mph (i.e., 0 km/h to 32 km/h) define a first flight realm, a speed of 21 mph to 150 mph (34 km/h to 241 km/h) defines a second flight realm, and speeds of 151 mph (243 km/h) and above defines a third realm parameter) adjusting the flight realm parameters may include changing the parameters of the flight realms within the flight realm dimension (i.e., change first flight realm parameters to 0 mph to 50 mph (i.e., 0 km/h to 80 km/h) and the second flight realm parameters to 51 mph to 150 mph (82 km/h to 241 km/h)). Adjusting the flight realm parameters may also include changing the flight realm parameters to define an additional flight realm in the same dimension. Using the flight speed example, a fourth realm may be added, such that speeds of 0 mph to 20 mph (i.e., 0 km/h to 32 km/h) define the first flight realm, 21 mph to 50 mph (i.e., 34 km/h to 80 km/h) defines the second realm, 51 mph to 150 mph (82 km/h to 241 km/h) defines the third flight realm, and 151 mph (243 km/H) or greater defines a fourth flight realm. Adding a new realm within a realm dimension, for example, a new realm within realm dimension 942 in FIG. 4, may increase a fault detection accuracy of fault detection system 200, as a new threshold value may be correspond to the new realm. Step 920 may include modifying, by controller 208, realm parameter database 230 and/or realm lookup table 232.

Step 930 may comprise changing, by controller 208, a fault threshold value within a realm. Step 930 may include modifying realm parameter database 230 and/or realm lookup table 232.

Step 940 may comprise adding, by controller 208, one or more additional realm dimensions to the fault threshold determination. For example, with reference to FIG. 4, a first realm dimension 942 may be defined using a first engine parameter 950 (e.g., altitude), a second realm dimension 944 may be defined using a second engine parameter 952 (e.g., thrust). Fault detection system 200 may include any number N of realm dimensions. Each realm within a realm dimension (i.e., realm 1.1, realm 1.2, realm 1.2 realm 2.2, etc.) may be configured to produce a different fault threshold for input into fault detection algorithm 234.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An article of manufacture including a tangible, non-transitory computer-readable storage medium having instructions stored thereon for detecting a fault in a gas turbine engine that, in response to execution by a controller, cause the controller to perform operations comprising:
    receiving, by the controller, a first data output from a first flight data source, the first flight data source comprising a first sensor configured to detect a first operating condition of the gas turbine engine, wherein the first data output correlates to the first operating condition of the gas turbine engine;
    receiving, by the controller, a second data output from a second flight data source, the second flight data source comprising at least one of a second sensor or an avionics unit configured to detect a second operating condition of the gas turbine engine, wherein the second data output correlates to the second operating condition of the gas turbine engine;
    determining, by the controller, a first flight realm of the first data output based on whether a rate of variance of the second data output is at least one of above or below a predetermined rate of variance threshold, wherein the first flight realm defines an engine transient state;
    identifying, by the controller, a first fault threshold for the first data output in the first flight realm, wherein the first fault threshold is different from a second fault threshold for the first data output in a second flight realm; and
    comparing, by the controller, the first data output to the first fault threshold.

2. The article of manufacture of claim 1, wherein the determining, by the controller, the first flight realm of the first data output further comprises:
    receiving, by the controller, a third data output from a third flight data source; and
    determining, by the controller, the first flight realm of the first data output based on the variance in the second data output and the third data output.

3. The article of manufacture of claim 1, wherein the second flight realm defines an engine steady state.

4. The article of manufacture of claim 1, further including displaying, by the controller, an alert if the first data output exceeds the fault threshold.

5. The article of manufacture of claim 4, further comprising performing, by the controller, a realm tuning operation.

6. The article of manufacture of claim 5, wherein the performing, by the controller, the realm tuning operation comprises:
verifying an accuracy of the alert; and
updating a fault detection parameter.

7. The article of manufacture of claim 6, where the updating the fault detection parameter comprises at least one of:
modifying, by the controller, a fault detection algorithm;
changing, by the controller, the first parameter of the first flight realm;
changing, by the controller, the first fault threshold.

8. The article of manufacture of claim 6, wherein the accuracy of the alert is verified during a post-flight inspection.

9. A method for fault detection in a gas turbine engine, comprising:
receiving, by a controller, a first data output from a first sensor configured to detect a first operating condition of the gas turbine engine, wherein the first data output correlates to the first operating condition of the gas turbine engine;
receiving, by the controller, a second data output from at least one of a second sensor or an avionics unit, wherein the second data output correlates to at least one of a second operating condition of the gas turbine engine or a flight parameter;
determining, by the controller, a first flight realm of the first data output based on whether a rate of variance of the second data output is at least one of above or below a predetermined rate of variance threshold, wherein the first flight realm defines an engine transient state;
identifying, by the controller, a first fault threshold for the first data output in the first flight realm, wherein the first fault threshold is different from a second fault threshold for the first data output in a second flight realm;
comparing, by the controller, the first data output to the first fault threshold; and
displaying, by the controller, an alert on a display device if the first data output exceeds the first fault threshold.

10. The method of claim 9, wherein the identifying, by the controller, the fault threshold further comprises:
receiving, by the controller, a third data output; and
identifying, by the controller, the first flight realm using the third data output and the second data output.

11. The method of claim 9, further comprising accessing, by the controller, a realm parameter database.

12. The method of claim 11, wherein the realm parameter database comprises a realm lookup table.

13. The method of claim 9, wherein the second data output is received by the controller in a trailing time-window.

14. The method of claim 9, further comprising performing a realm tuning operation, wherein the performing the realm tuning operation comprises:
verifying an accuracy of the alert; and
updating a fault detection parameter.

15. The method of claim 14, wherein the updating the fault detection parameter comprises at least one of:
modifying, by the controller, a fault detection algorithm;
changing, by the controller, a parameter of the first flight realm;
changing, by the controller, the first fault threshold.

16. A system for fault detection in a gas turbine engine, comprising:
a controller;
a first engine flight data source in communication with the controller, wherein the first engine flight data source comprises at least one of a first sensor or an avionics unit;
a second engine flight data source in communication with the controller, wherein the second engine flight data source comprises at least one of a second sensor or the avionics unit; and
a tangible, non-transitory memory configured to communicate with the controller, the tangible, non-transitory memory having instructions stored thereon that, in response to execution by the controller, cause the controller to perform operations comprising:
receiving, by a controller, a first data output from the first engine flight data source, wherein the first data output correlates to a first operating condition of the gas turbine engine or a first flight parameter,
receiving, by the controller, a second data output from the second engine flight data source, wherein the second data output correlates to at least one of a second operating condition of the gas turbine engine or a second flight parameter,
determining, by the controller, a first flight realm of the first data output based on whether the second data output is at least one of above or below a predetermined threshold, wherein the first flight realm defines an engine transient state,
identifying, by the controller, a first fault threshold for the first data output in the first flight realm, wherein the first fault threshold is different from a second fault threshold for the first data output in a second flight realm, and
comparing, by the controller, the first data output to the first fault threshold.

17. The system of claim 16, wherein the identifying, by the controller, the first fault threshold further comprises:
receiving, by the controller, a third data output;
determining, by the controller, the first flight realm of the first data output based on the third data output and the second data output.

18. The system of claim 16, further comprising an alert in communication with controller.

19. The system of claim 18, wherein upon detection of a false alert, a realm tuning operation is performed, the realm tuning operation comprising at least one of:
modifying, by the controller, a fault detection algorithm;
changing, by the controller, a parameter of the first flight realm; or
changing, by the controller, the first fault threshold.

* * * * *